(12) United States Patent
Wakazono et al.

(10) Patent No.: US 9,677,971 B2
(45) Date of Patent: Jun. 13, 2017

(54) TIRE TESTING MACHINE

(71) Applicant: Kobe Steel, Ltd., Kobe-shi (JP)

(72) Inventors: Takehiko Wakazono, Takasago (JP);
Yoshiaki Matsubara, Takasago (JP);
Maiko Mori, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 128 days.

(21) Appl. No.: 14/622,016

(22) Filed: Feb. 13, 2015

(65) Prior Publication Data

US 2015/0300922 A1    Oct. 22, 2015

(30) Foreign Application Priority Data

Apr. 16, 2014  (JP) .................................. 2014-084418

(51) Int. Cl.
*G01M 17/02* (2006.01)

(52) U.S. Cl.
CPC ................................. *G01M 17/021* (2013.01)

(58) Field of Classification Search
CPC .................................................. G01M 17/021
See application file for complete search history.

(56) References Cited

U.S. PATENT DOCUMENTS

| | | | | |
|---|---|---|---|---|
| 3,741,473 A * | 6/1973 | Finley | ..................... | G01C 22/00 235/95 R |
| 4,449,191 A * | 5/1984 | Mehnert | ............... | G01P 3/4802 250/231.16 |
| 5,883,304 A | 3/1999 | Kokubu et al. | | |
| 6,417,918 B1 | 7/2002 | Anno et al. | | |
| 8,770,254 B1 * | 7/2014 | Hanneken | ............. | B60C 25/138 157/1.17 |
| 2005/0210976 A1 * | 9/2005 | Gerdes | .................... | G01M 1/08 73/459 |
| 2013/0233066 A1 | 9/2013 | Wakazono et al. | | |
| 2013/0333615 A1 * | 12/2013 | Wakazono | ............. | B65G 37/00 118/500 |

FOREIGN PATENT DOCUMENTS

| | | |
|---|---|---|
| DE | 697 26 803 T2 | 6/2004 |
| JP | 2001 159584 | 6/2001 |
| JP | 2010-185709 A | 8/2010 |
| JP | 2012 127794 | 7/2012 |
| JP | 2012220319 A * | 11/2012 ............. B65G 37/00 |

* cited by examiner

*Primary Examiner* — Michael A Lyons
*Assistant Examiner* — Jean Morello
(74) *Attorney, Agent, or Firm* — Oblon, McClelland, Maier & Neustadt, L.L.P.

(57) ABSTRACT

A tire testing machine includes a test station in which spindles to attach a tire on which a barcode is installed are provided, and first and second belt conveyors that feed the tire into a center position of the spindles. In order to stably grasp a position of identifying information of the tire and stop rotation of the tire at an arbitrary desired angle, before applying a lubricant to a bead portion on an inner periphery of the tire conveyed to the first belt conveyors by means of the lubricator and feeding the tire into the test station, a controller grasps a position of the barcode on the tire based on a rotation angle relative to the direction connecting a position where the barcode is detected by a barcode scanner and the center of the tire.

8 Claims, 17 Drawing Sheets

TIRE TESTING MACHINE

BACKGROUND OF THE INVENTION

Field of the Invention

The present invention relates to a tire testing machine for performing a performance test of a tire.

Description of the Related Art

When there is a part in which elastic modulus, size, or a shape is not uniform in the circumferential direction in a tire to be installed in an automobile or the like, the above part generates vibration at the time of high-speed rotation and causes lowering of a running performance. Therefore, circumferential uniformity of the tire is checked by a tire testing machine after a vulcanizing process. With this tire testing machine, after a bead portion on an inner periphery of the tire is fitted into a rim member and attached to rotating spindles and predetermined internal pressure is applied to the tire, rotation and driving are performed while an outer periphery of the tire is pressed onto a road surface substitute member such as a drum, and a test is performed. In general, a lubricant (lubricant liquid) is applied to the bead portion of the tire to be tested in order to smoothly fit into the rim member (refer to JP 2012-127794 A).

Meanwhile, in a tire manufacturing step, in a series of tasks of installing identifying information such as a barcode onto a tire, vulcanizing and molding the tire, and performing a test, the tire is managed with the identifying information. In a case where the tire is managed with the barcode in such a way, in a tire testing machine, before putting the tire into the tire testing machine, or after mounting the tire on an inlet conveyor of the tire testing machine, the identifying information of the tire to be tested is read in by an identifying information detection sensor.

In the field of the tire testing machine, a tire checking method and a tire checking device in which tire data acquired in the rotation direction (tire circumferential direction) is managed based on a rotation direction angle of a position of identifying information relative to a reference point are developed (refer to JP 2001-159584 A). In JP 2001-159584 A, the rotation direction angle is detected with an angle when a barcode is put into a balance dot position detection unit (tire test station) as a reference.

However, JP 2001-159584 A describes, as in the paragraph [0030], that rotation of the tire is stopped when a barcode reader reads the barcode but does not describe any other examples. In the tire testing machine, in a step after the rotation of the tire is stopped, it is not always desirable that the step is moved to the above step while maintaining the position of the tire whose rotation is stopped when the barcode reader reads the barcode. In reality, there is frequently a demand to stop the rotation of the tire at an arbitrary desired angle. However, with this tire testing machine of the related art, the demand cannot be met.

SUMMARY OF THE INVENTION

An object of the present invention is to provide a tire testing machine capable of stably grasping a position of identifying information of a tire and stopping rotation of the tire at an arbitrary desired angle.

In order to achieve the above object, a tire testing machine according to the present invention is a tire testing machine that tests a tire on which identifying information is installed, the tire testing machine including a test station in which spindles to attach the tire are provided, a conveyor that feeds the tire into a center position of the spindles, a tire rotation device arranged in the conveyor on the upstream side in the conveying direction of the test station, the tire rotation device that rotates the tire, an identifying information detection sensor arranged in the conveyor on the upstream side in the conveying direction of the test station, the identifying information detection sensor that detects the identifying information installed on the tire which is rotated by the tire rotation device, and a control unit that detects the identifying information by means of the identifying information detection sensor, calculates a rotation angle relative to the direction connecting a position of the detected identifying information and the center of the tire, monitors a position of the identifying information of the tire, and further, when the rotation angle of the tire becomes a target stopping angle designated in advance, stops rotation of the tire.

With this configuration, the position of the identifying information of the tire can be stably grasped and the rotation of the tire can be stopped at an arbitrary desired angle.

In the tire testing machine according to the present invention, a lubricator that applies a lubricant to a bead portion on an inner periphery of the tire rotated by the tire rotation device may be provided, and the control unit may detect the identifying information of the tire rotated by the tire rotation device by means of the identifying information detection sensor before applying the lubricant to the bead portion on the inner periphery of the tire by means of the lubricator.

With this configuration, before the lubricating liquid is applied to the bead portion on the inner periphery of the tire, the position of the identifying information is detected. The position of the identifying information of the tire is monitored based on the rotation angle relative to the direction connecting the position of the identifying information of the tire and the center of the tire. Therefore, even when the identifying information cannot be detected by the identifying information detection sensor in any state after that, the position of the identifying information of the tire can be stably grasped. The position of the identifying information of the tire can be directed in the desired angle direction. Since the tire rotation device and the identifying information detection sensor are arranged on the upstream side in the conveying direction of the test station, placement of an extra device into the tire testing machine in order to direct the position of the identifying information of the tire in the desired angle direction can be prevented.

In the tire testing machine according to the present invention, the tire rotation device may have an arm member that grips the tire conveyed by the conveyor, and a rotation roller arranged in a front end of the arm member, the rotation roller to be rotatably abutted with the tire, and the control unit may calculate the rotation angle based on a time to be taken for next detection after detecting the identifying information by means of the identifying information detection sensor.

With this configuration, the rotation angle can be easily calculated based on a rotation number of the rotation roller and the like. It should be noted that the circumferential length of the rotation roller and the circumferential length of the tire may be a diameter of the rotation roller and a diameter of the tire.

In the tire testing machine according to the present invention, the tire rotation device may have an arm member that grips the tire conveyed by the conveyor, and a rotation roller arranged in a front end of the arm member, the rotation roller to be rotatably abutted with the tire, and the control unit may calculate the rotation angle based on a time to be taken for next detection after detecting the identifying information by means of the identifying information detection sensor. Alternatively, the tire rotation device may have a rotatable lower roller member that supports the tire conveyed by the conveyor from the lower side, and the control unit may calculate the rotation angle based on a time to be taken for next detection after detecting the identifying information by means of the identifying information detection sensor.

With this configuration, the rotation angle can be easily calculated based on the time to be taken for next detection after detecting the identifying information by the identifying information detection sensor.

In the tire testing machine according to the present invention, the target stopping angle may be an angle when the tire is fed into the test station.

With this configuration, the tire can be fed into the test station while the identifying information is matched with a desired target stopping angle, so that measurement data in the circumferential direction of the tire can be properly managed in the test station.

In the tire testing machine according to the present invention, the identifying information may be a barcode, and the identifying information detection sensor may be a barcode reader.

With this configuration, the present invention can be applied to the tire on which the barcode is installed.

The tire testing machine of the present invention can stably grasp the position of the identifying information of the tire and stop the rotation of the tire at an arbitrary desired angle.

DESCRIPTION OF THE PREFERRED EMBODIMENTS

Hereinafter, a mode for carrying out a tire testing machine according to the present invention will be described along one specific example with reference to the drawings.

It should be noted that the following description is only an example and does not indicate a limit of application of the tire testing machine according to the present invention. That is, the tire testing machine according to the present invention is not limited to the following embodiment but can be variously changed within the scope described in the claims.

Figure 1:
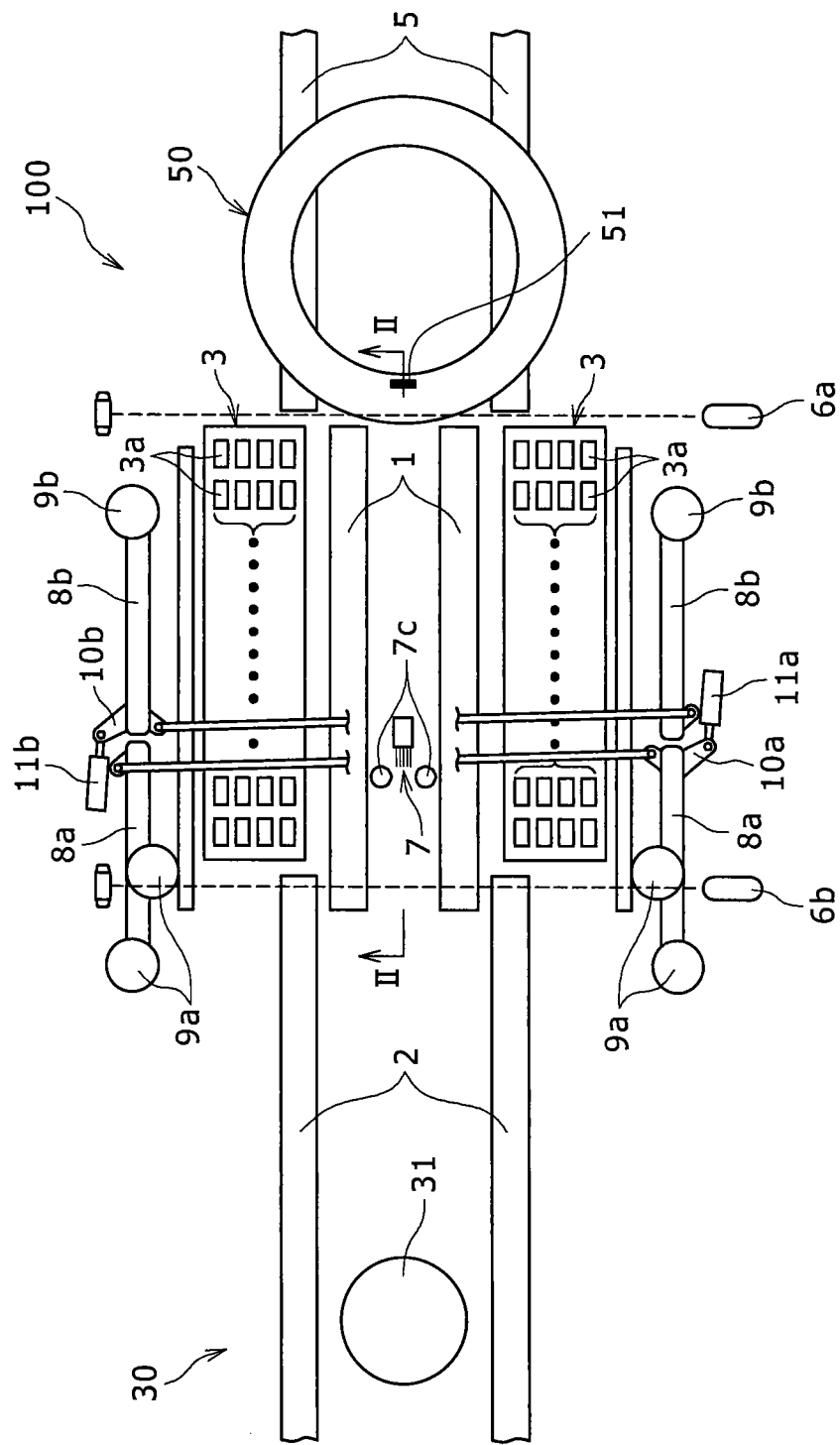
FIG. 1 is a top view showing a tire testing machine according to the present embodiment.
Figure 2:
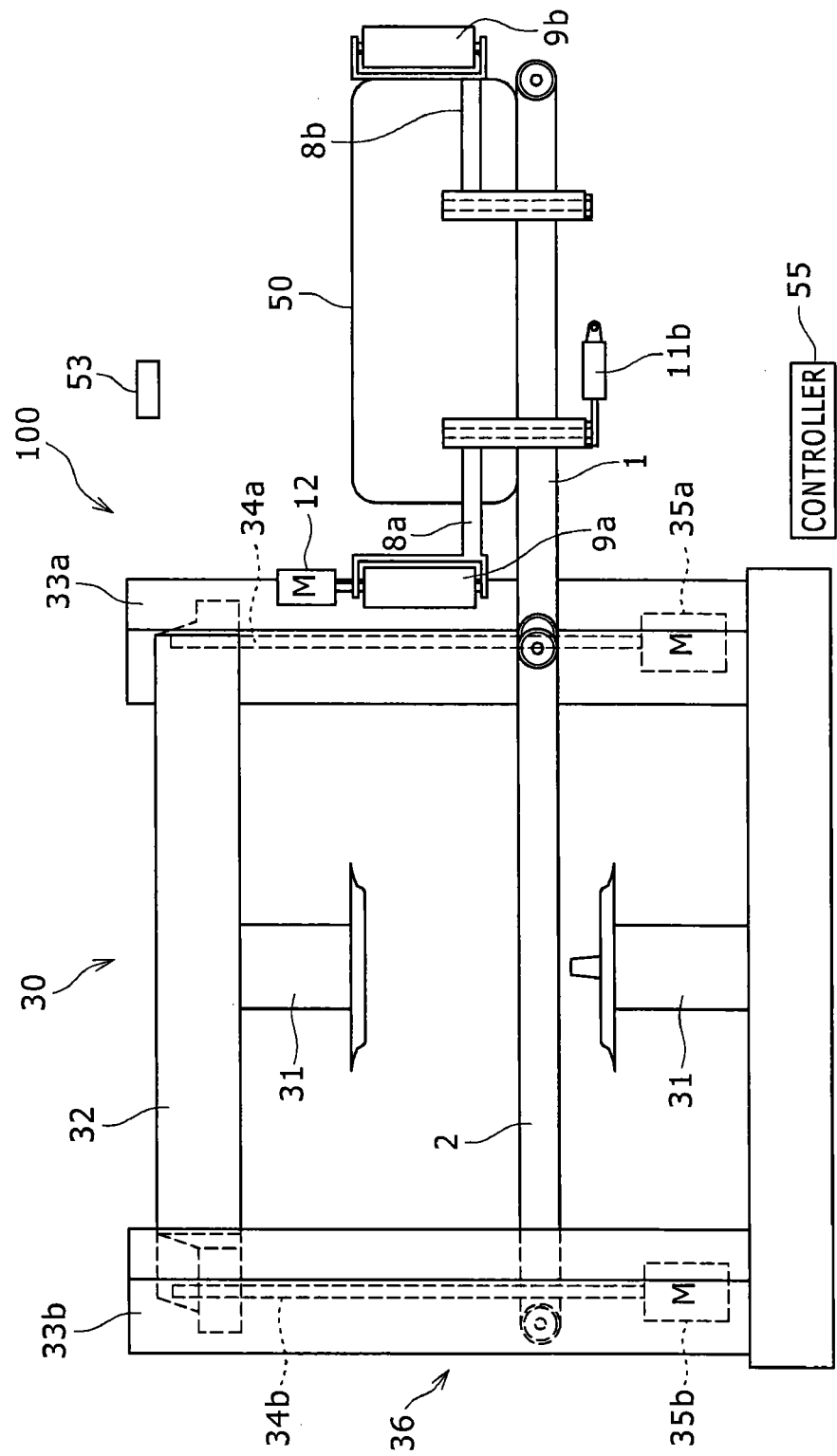
FIG. 2 is a side view showing the tire testing machine according to the present embodiment.

The tire testing machine according to the present embodiment will be described. As shown in FIGS. 1 and 2, a tire testing machine 100 includes a tire testing machine conveyor formed by first belt conveyors 1 and second belt conveyors 2, and a test station 30 in which spindles 31 arranged on the upper and lower sides to attach a tire 50 to be tested are provided.

The first belt conveyors 1 are formed as one pair of two belt conveyors that convey the tire 50 mounted thereon in a falling state. On the upstream side in the conveying direction of the first belt conveyors 1, a supply conveyor 5 that supplies the tire 50 to be tested is connected. The second belt conveyors 2 are formed as one pair of two belt conveyors connected on the downstream side in the conveying direction of the first belt conveyors 1 and arranged so as to extend into the test station 30 of the tire testing machine. The second belt conveyors 2 feed the tire 50 received from the first belt conveyors 1 into a rotation center position of the perpendicularly-directed spindles 31 provided in the test station 30.

Either the first belt conveyors 1 or the second belt conveyors 2 are formed so as to partially have a conveying surface in the width direction at right angle to the conveying direction, and in the example shown in the figure, formed by a pair of two conveying belts in such a manner that the conveying surface is divided into two parts. It should be noted that the tire testing machine conveyor is not necessarily formed by a plurality of belt conveyors as in the first belt conveyors 1 and the second belt conveyors 2 but may be one belt conveyor. One of pulleys in either the first belt conveyors 1 or the second belt conveyors 2 is connected to a belt conveyor servomotor (not shown), and by rotating the belt conveyor servomotor, either the first belt conveyors 1 or the second belt conveyors 2 can be driven.

On the upstream side in the conveying direction of the first belt conveyors 1, a photoelectric sensor 6a that detects a rear end of the tire 50 to be conveyed to the downstream side in the conveying direction along the conveying direction is provided. On the downstream side in the conveying direction of the first belt conveyors 1, a photoelectric sensor 6b that detects a front end of the tire 50 to be fed into the second belt conveyors 2 is provided.

The upper and lower spindles 31 of the test station 30 nip the tire 50 from both the upper and lower sides with the center thereof being matched with the axis of the tire 50 conveyed by the second belt conveyors 2. In the test station, a chucking mechanism 36 including a slide beam 32, guide frames 33a, 33b, ball screws 34a, 34b, and motors 35a, 35b for chucking the tire 50 by nipping the tire 50 by the upper and lower spindles 31 is provided. That is, the chucking mechanism 36 is to drive the upper and lower spindles 31 so as to perform a chucking action.

In parts on the outer sides in the width direction of the pair of conveying belts where there is no conveying surface of the first belt conveyors 1, roller sections 3 in which a plurality of mounting rollers 3a is disposed are provided. The mounting rollers 3a form mounting surfaces on which the tire 50 in a falling state is mounted rotatably on the horizontal plane. It should be noted that the roller sections 3 may be provided on the inner side between the pair of conveying belts or may be provided on both the inner side and the outer sides. Between the two first belt conveyors 1, a lubricator 7 to be elevated by an air cylinder 7a is provided. The lubricator 7 includes a brush 7b that applies a lubricant (lubricant liquid) to a bead portion 50a on an inner periphery of the tire 50 as described later, and a pair of positioning rollers 7c to be abutted so as to position the inner periphery of the tire 50. A small air cylinder 7d is provided between the brush 7b and the axis of the air cylinder 7a in such a manner that the brush 7b can be advanced or retreated in the direction perpendicular to the axis of the air cylinder 7a.

Figure 3:
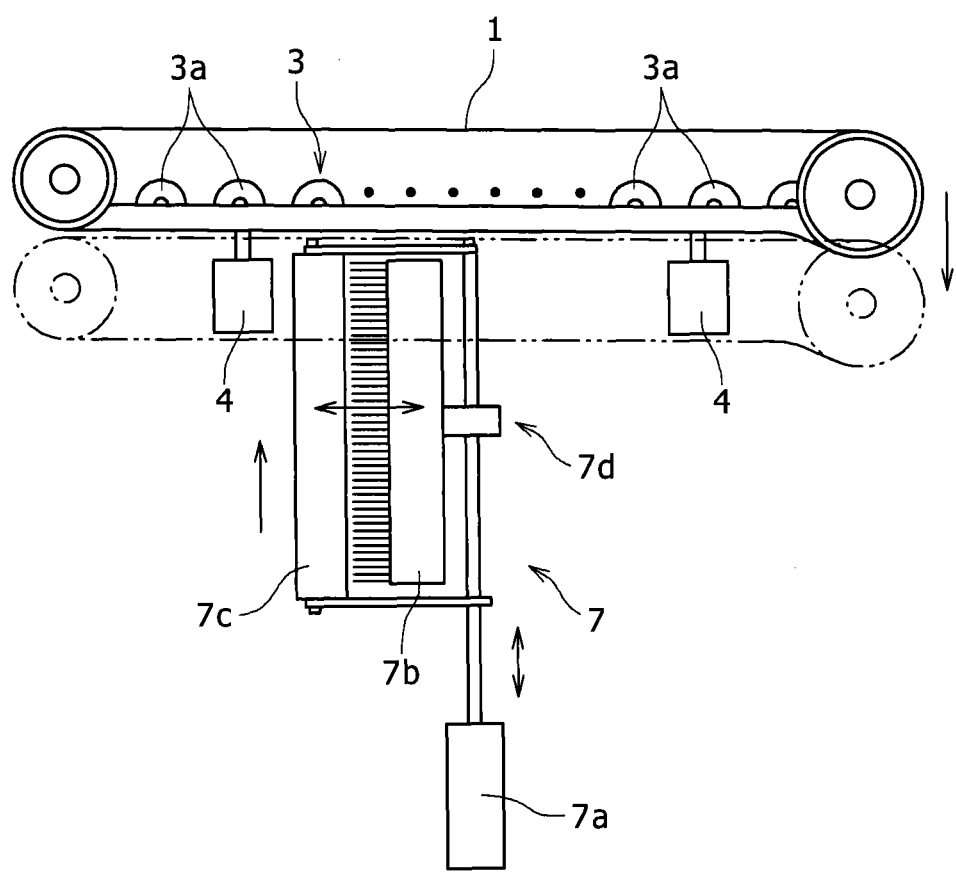
FIG. 3 is a sectional view taken along the line II-II of FIG. 1.

As shown in FIG. 3, the first belt conveyors 1 are elevated by a cylinder 4. When the tire 50 is conveyed, the conveying surface thereof is raised to the upper side of the mounting surfaces of the roller sections 3, and when the tire 50 is rotated as described later, the conveying surface is lowered to the lower side of the mounting surfaces of the roller sections 3. Upper and lower positions of the first belt conveyors 1 can be fixed and the roller sections 3 can be elevated. It should be noted that although the brush 7b can be advanced or retreated in the direction perpendicular to the axis of the air cylinder 7a as described above, the positioning rollers 7c are arranged at positions parallel to the axis of the air cylinder 7a and not formed to be movable relative to the axis of the air cylinder 7a.

On both the sides in the width direction of the first belt conveyors 1 arranged on the upstream side in the conveying direction of the test station 30, a pair of first arm members 8a with parts on the middle side of the conveying direction as pivot points and front ends directed to the downstream side in the conveying direction, and a pair of second arm members 8b with parts on the middle side of the conveying direction as pivot points and front ends directed to the upstream side in the conveying direction are provided. Rotatable pressing rollers (rotation rollers) 9a, 9b that press an outer peripheral surface of the rotating tire 50 to the center side as described later are attached to the first and second arm members 8a, 8b, and the first and second arm members are symmetrically pivoted to the inner side in the width direction by link mechanisms 10a, 10b and air cylinders 11a, 11b, respectively. The first arm members 8a and the second arm members 8b, and the pressing rollers 9a, 9b form a tire rotation device.

Figure 4A:
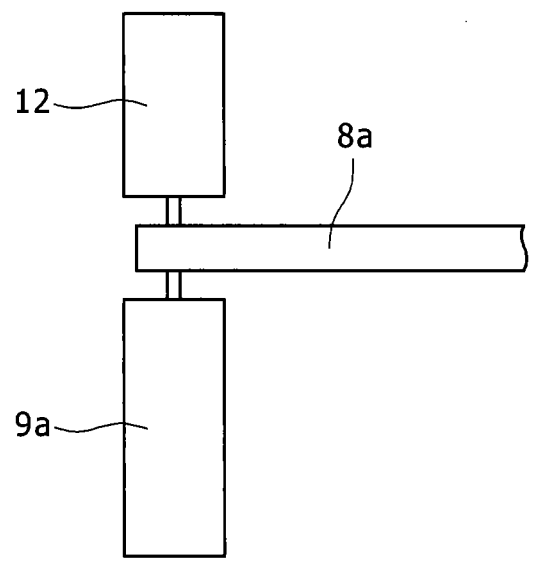
FIG. 4A is an enlarged front view showing one of pressing rollers.
Figure 4B:
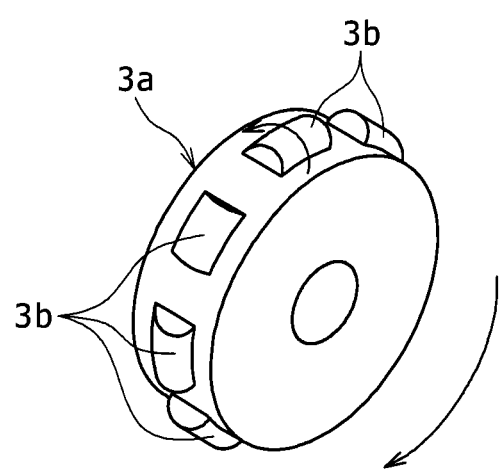
FIG. 4B is an enlarged perspective view showing a mounting roller.

Two pressing rollers 9a are provided in a front end part and a middle part of the first arm member 8a, and one pressing roller 9b is attached only to a front end part of the second arm member 8b. As shown in FIG. 4A, a motor 12 is connected to one or both of the pressing rollers 9a attached to the front end parts of the pair of first arm members 8a. By driving the motor 12, the pressing roller 9a is driven and rotated. Each of the mounting rollers 3a of the roller sections 3 forms the mounting surface on which the tire 50 is mounted rotatably on the horizontal plane. As shown in FIG. 4B, a plurality of child rollers 3b rotated about the rotation axes in the directions orthogonal to the rotation axis of the main body roller is arranged on an outer peripheral surface of the roller.

In the tire 50 to be tested, a barcode (identifying information) 51 is installed on a side surface in the vicinity of the bead portion. On the upper side of the first belt conveyors 1 on the upstream side in the conveying direction from the test station 30, a barcode scanner (identifying information detection sensor) 53 is suspended. The barcode scanner 53 is placed at a position where the barcode 51 installed on the tire 50 which is gripped by the first arm members 8a and the second arm members 8b can be read. The barcode scanner 53 is to detect the barcode 51 and read information of the barcode 51. The information of the barcode 51 read by the barcode scanner 53 is sent to a controller 55.

The controller 55 is formed to control actions of the belt conveyor servomotors connected to the first belt conveyors 1 and the second belt conveyors 2, the air cylinders 11a, 11b connected to the first and second arm members 8a, 8b, the motor 12 attached to the first arm member 8a, the cylinder 4 attached to the first belt conveyors 1, and the air cylinder 7a attached to the lubricator 7.

Next, a procedure of feeding the tire 50 supplied from the supply conveyor 5 into the test station 30 will be described. It should be noted that the following procedure is controlled by the controller 55.

Figure 5A:
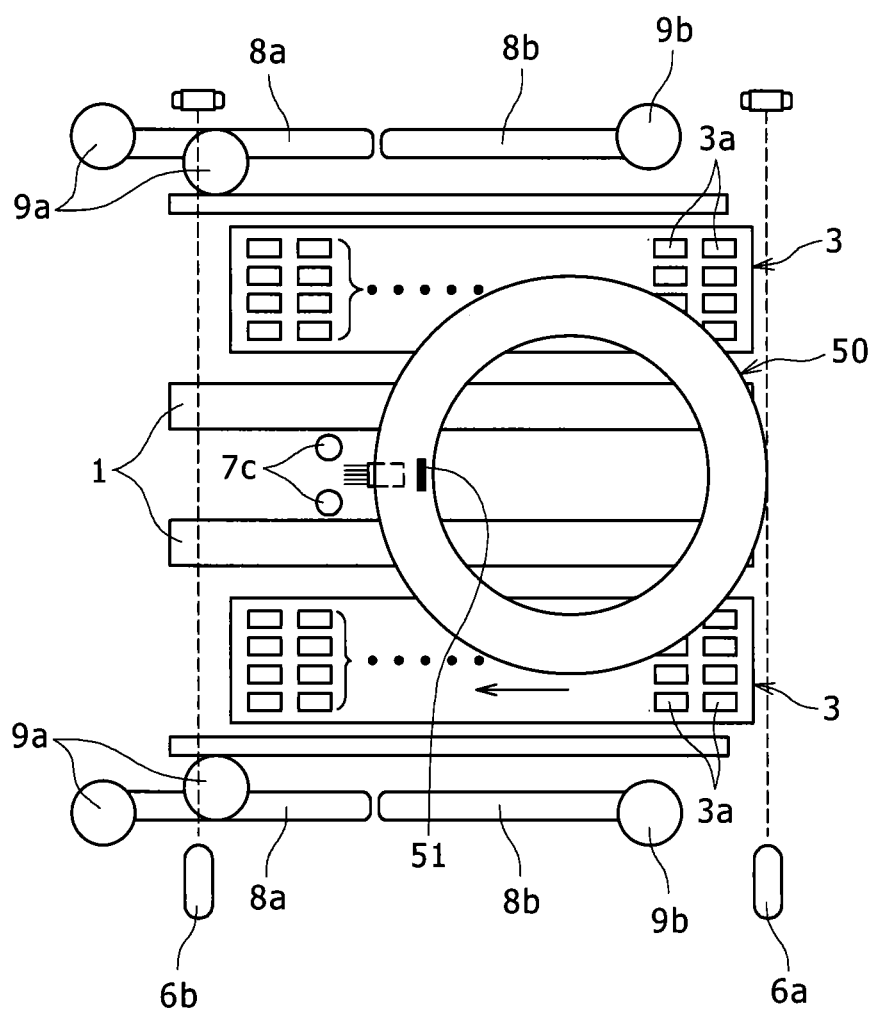
FIG. 5A is a plan view showing a process of conveying a tire by a tire testing machine conveyor.
Figure 5B:
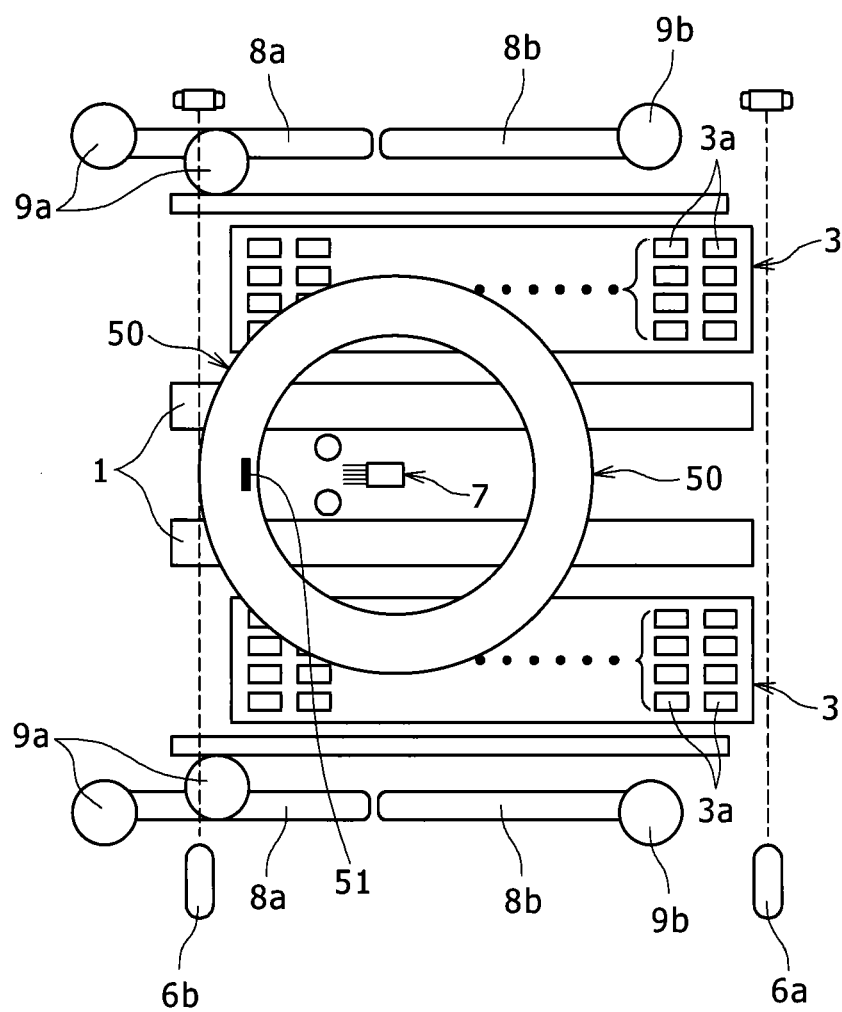
FIG. 5B is a top view showing a process of conveying the tire by the tire testing machine conveyor.

Firstly, as shown in FIG. 5A, the belt conveyor servomotor is rotated and the first belt conveyors 1 are driven. The rear end of the tire 50 supplied from the supply conveyor 5 to the first belt conveyors 1 is detected by the photoelectric sensor 6a on the upstream side in the conveying direction, and the tire is conveyed along the conveying direction at relatively low fixed conveying velocity. Next, as shown in FIG. 5B, when the front end is detected by the photoelectric sensor 6b on the downstream side in the conveying direction, by once stopping rotation of the belt conveyor servomotor and stopping drive of the first belt conveyors 1, conveyance of the tire 50 is stopped.

As shown in FIG. 3, the lubricator 7 is lowered to the lower side of the conveying surface of the first belt conveyors 1. As shown in FIGS. 5A and 5B, the first and second arm members 8a, 8b are pivoted to the outer sides in the width direction into an open state by the air cylinders 11a, 11b, so that a space for conveying the tire 50 is ensured on the conveying surface of the first belt conveyors 1.

Figure 6A:
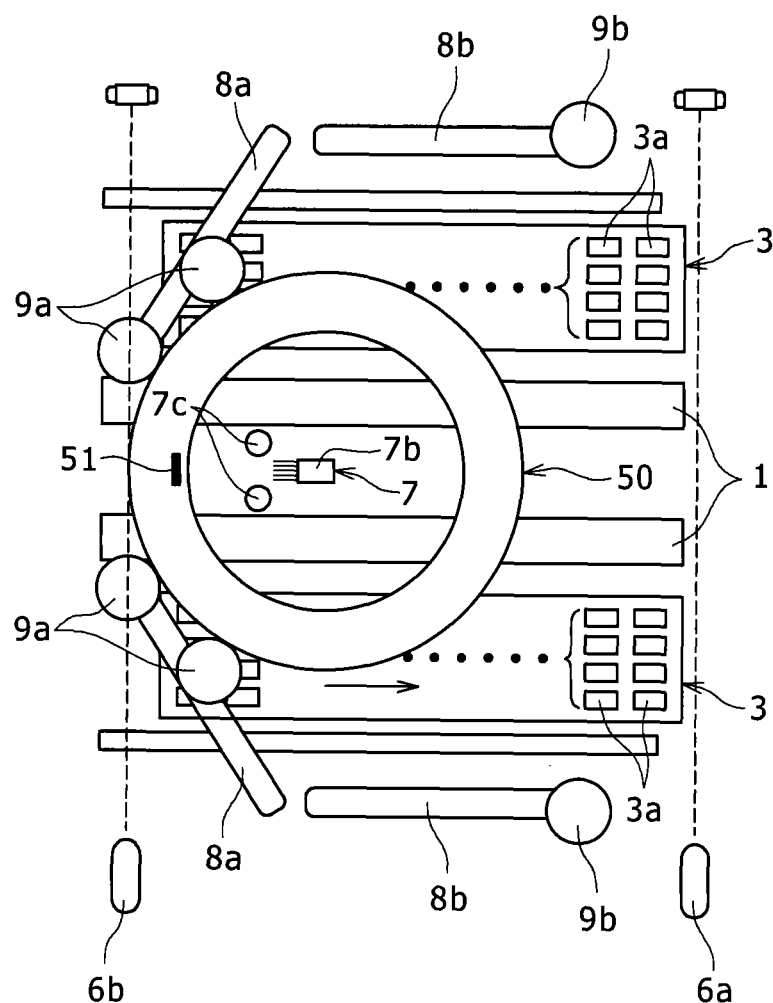
FIG. 6A is a top view showing a process of gripping the tire by arms and the pressing rollers.

Next, the conveying surface of the first belt conveyors 1 is lowered to the lower side of the roller sections 3 by the cylinder 4 and the tire 50 is moved and mounted onto the roller sections 3. That is, the conveying surface of the first belt conveyors 1 is lowered so as to be positioned on the lower side of upper ends (child rollers 3b) of the mounting rollers 3a of the roller sections 3, and the tire 50 is moved and mounted onto the child rollers 3b of the mounting rollers 3a serving as the mounting surfaces. Next, the lubricator 7 is raised by the air cylinder 7a, so that (the brush 7b and the positioning rollers 7c of) the lubricator 7 protrudes out on the upper side of the conveying surface of the first belt conveyors 1 and further the mounting surfaces of the tire 50. It should be noted that at this time, the brush 7b is in a state where the brush is retreated in the direction perpendicular to the axis of the air cylinder 7a, that is, the axes of the positioning rollers 7c. As shown in FIG. 6A, the first arm members 8a are pivoted to the inner side in the width direction, and the tire 50 mounted on the roller sections 3 is pushed back to the upstream side in the conveying direction by the pressing rollers 9a thereof.

Figure 6B:
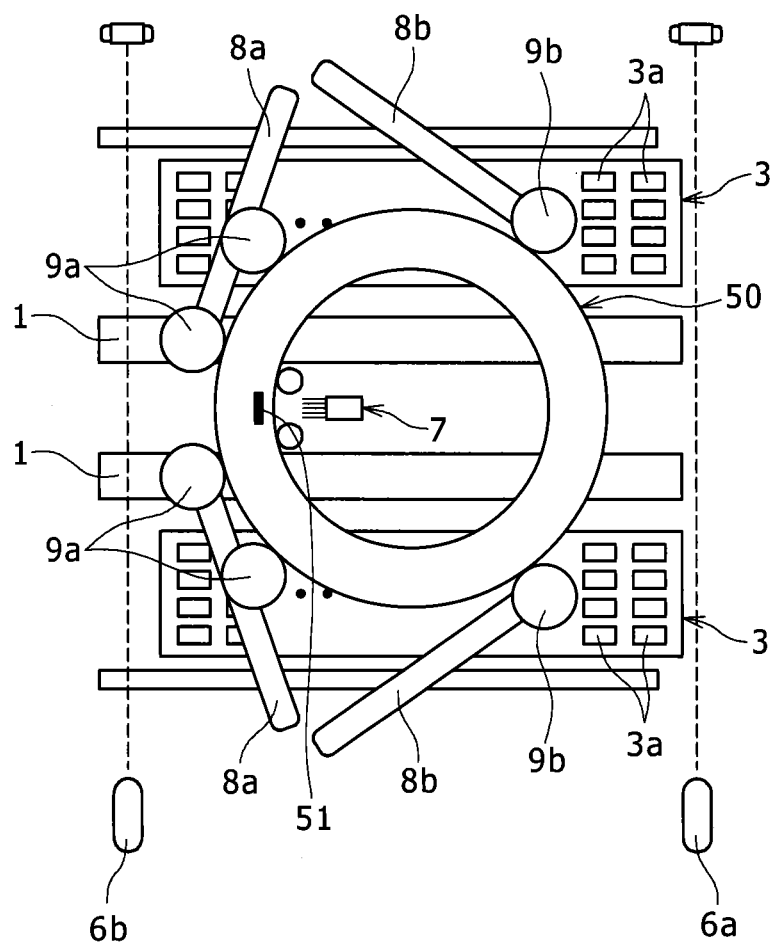
FIG. 6B is a top view showing a process of gripping the tire by the arms and the pressing rollers.

When the tire 50 is pushed back to a position where the positioning rollers 7c of the lubricator 7 are abutted with the inner periphery by the first arm members 8a, as shown in FIG. 6B, the second arm members 8b are pivoted to the inner side in the width direction, and an outer periphery of the tire 50 is pressed onto the center side by the pressing rollers 9a, 9b of the first and second arm members 8a, 8b. In this state, the tire 50 is gripped by the pressing rollers 9a, 9b of the first and second arm members 8a, 8b.

Figure 7A:
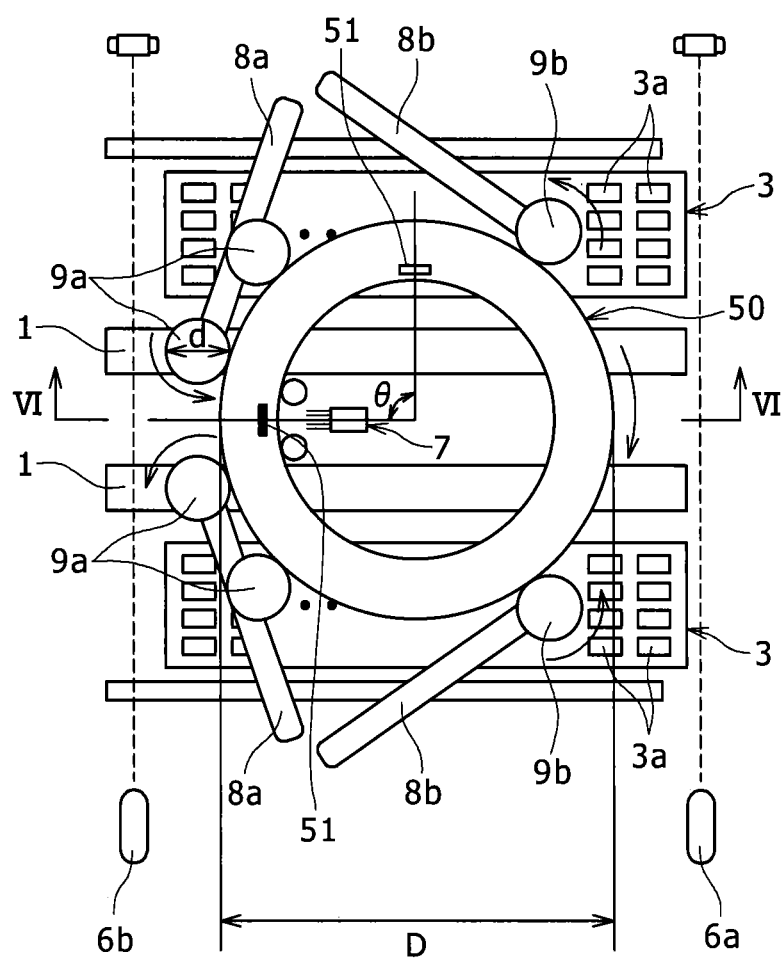
FIG. 7A is a top view showing a process of rotating the tire by the pressing roller and monitoring a position θ of a barcode of the tire.

As shown in FIG. 7A, the pressing rollers 9a attached to the front end part of one of the first arm members 8a is driven and rotated in the arrow direction by the motor 12. Accordingly, the tire 50 and the other pressing rollers 9a, 9b are rotated. At the same time, detection of a position of the barcode 51 on the tire 50 is started by the barcode scanner 53, and monitoring of the position of the barcode 51 is started.

Hereinafter, a procedure of processing of monitoring the position of the barcode 51 of the tire 50 and stopping the position of the barcode 51 of the tire 50 at a target stopping angle will be described.

The position of the barcode 51 is monitored from a time point when the barcode 51 is detected by the barcode scanner 53 based on a rotation angle θ relative to the direction connecting a position where the barcode 51 is detected and the center of the tire 50. As shown in FIG. 7A, in order to monitor the position of the barcode 51 based on the rotation angle θ relative to the direction connecting the position where the barcode 51 is detected and the center of the tire 50, the rotation angle θ is calculated. In FIG. 7A, a blackened oblong barcode 51 indicates the position where the barcode 51 is detected, and a whitened oblong barcode 51 indicates a position of the barcode 51 to be monitored. The rotation angle θ (degree) is calculated by the following equation with a rotation number m of the pressing roller 9a, a circumferential length n (m) of the other pressing rollers 9a, and a circumferential length L (m) of the tire 50. It should be noted that a rotation number of the pressing roller 9a is not necessarily an integer but may be defined based on an angle during rotation.

$$\theta = 360 \times n \times m / L$$

wherein the values n and L are calculated by the following equations.

n=πd wherein d: diameter (m) of the pressing roller 9a
L=πD wherein D: diameter (m) of the tire 50
That is, the rotation angle θ may be calculated as follows.

$$\theta = 360 \times d \times m / D$$

According to this, the rotation angle can be easily calculated based on a rotation number of the pressing roller 9a and the like. At a time point when the calculated rotation angle θ (degree) is matched with the target stopping angle, rotation of the tire 50 is stopped. It should be noted that the target stopping angle is designated in advance as the rotation angle relative to the direction connecting the position where the barcode 51 is detected on the tire 50 and the center of the tire 50. The target stopping angle may be an angle at the time of feeding into the test station 30. This is because the tire 50 can be fed into the test station 30 while the barcode 51 of the tire 50 is matched with a desired target stopping angle, so that measurement data in the circumferential direction of the tire 50 can be properly managed in the test station 30.

Figure 12:
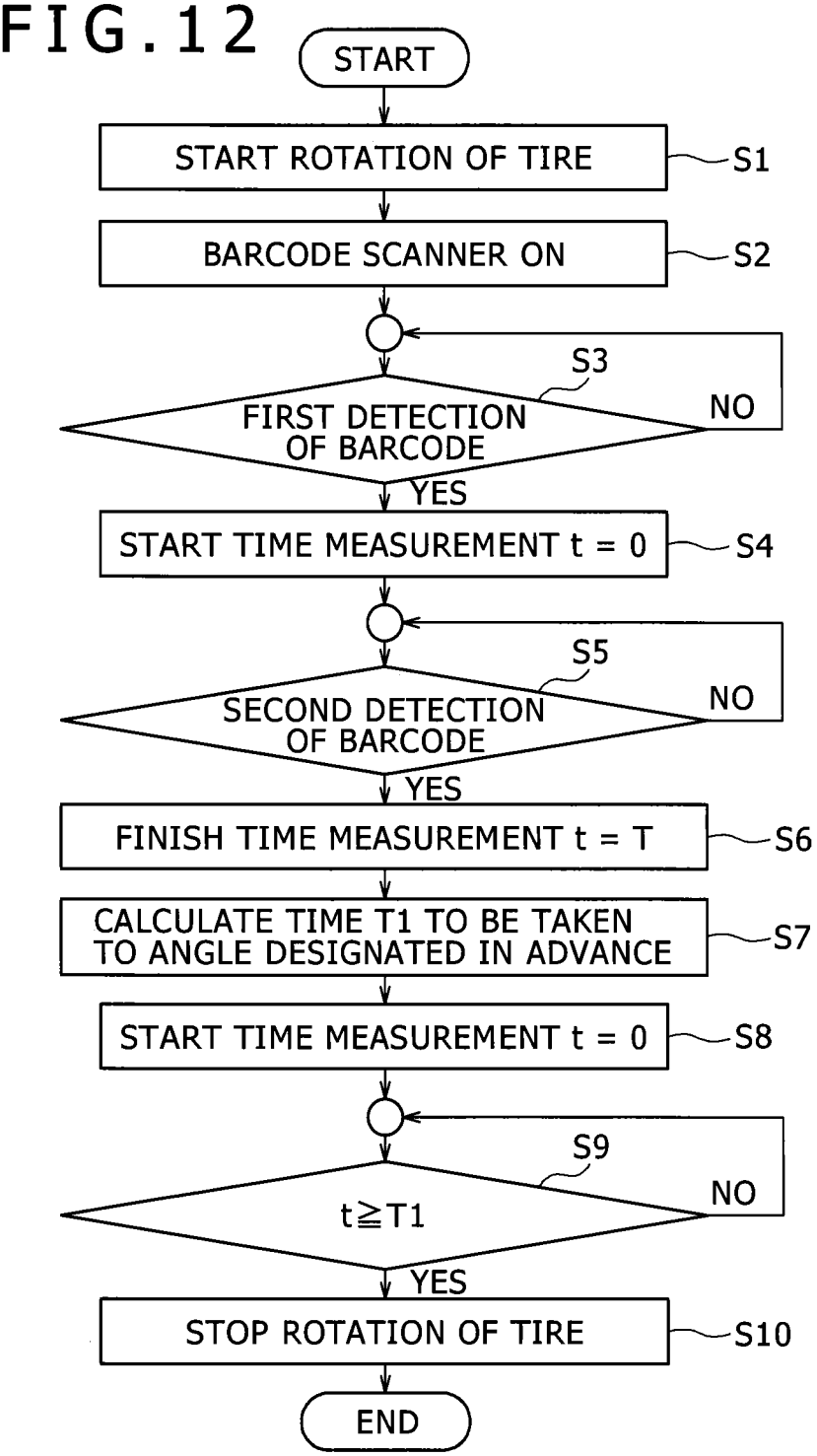
FIG. 12 is a flowchart showing a procedure of processing of monitoring the position of the barcode in a controller.

Hereinafter, based on FIGS. 7B and 12, a procedure of stopping the position of the barcode 51 of the tire 50 at a target stopping angle W, the procedure which is different from the above procedure will be described.

The position of the barcode 51 is monitored from a time point when the barcode 51 is detected by the barcode scanner 53 based on the target stopping angle W relative to the direction connecting the position where the barcode 51 is detected and the center of the tire 50. As shown in FIG. 7B, in order to stop the position of the barcode 51 at the target stopping angle W relative to the direction connecting the position where the barcode 51 is detected and the center of the tire 50, a stopping start command time T1 for stopping at the target stopping angle W after detecting the barcode 51 by the barcode scanner 53 is determined. In FIG. 7B, a blackened oblong barcode 51 indicates the position where the barcode 51 is detected, and a whitened oblong barcode 51 indicates a position of the barcode 51 to be monitored.

Figure 7B:
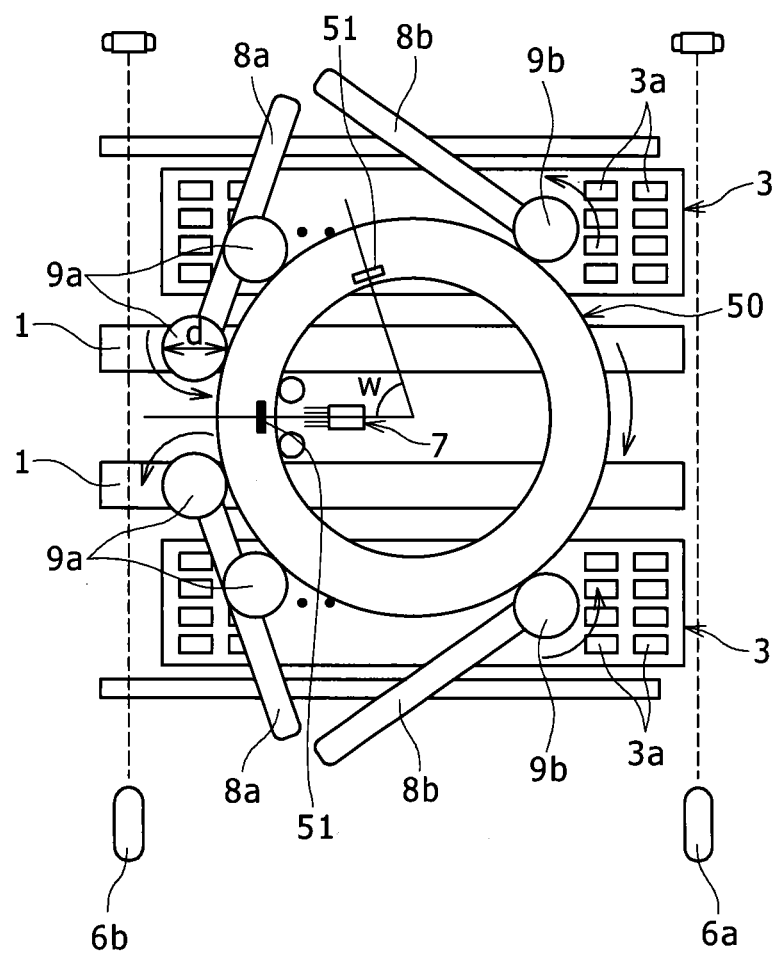
FIG. 7B is a top view showing a process of rotating the tire by the pressing roller and stopping the position of the barcode of the tire at a target stopping angle W.

Firstly, as shown in FIG. 7B, the pressing roller 9a attached to the front end part of one of the first arm members 8a is driven and rotated in the arrow direction by the motor 12, and the rotation of the tire 50 is started (S1). Next, detection of the barcode 51 by the barcode scanner 53 is started (S2).

When first detection of the barcode 51 by the barcode scanner 53 is performed (S3), time measurement is started with a time at the time point t=0 (S4).

When second detection of the barcode 51 by the barcode scanner 53 is performed (S5), the time measurement is stopped and a time T from the start to stop of the time measurement is stored (S6). The time T is a time for the tire 50 to do a 360-degree roll.

From the time T, the time T1 to be taken to the target stopping angle designated in advance is calculated (S7). The time T1 is the stopping start command time for stopping at the target stopping angle W after detecting the barcode 51 by the barcode scanner 53 in order to stop at the target stopping angle relative to the direction connecting the position where the barcode 51 is detected and the center of the tire 50. When set rotation velocity of the pressing roller 9a is V (rpm), the target stopping angle of the tire 50 is W (degree), and an angle by which the tire is rotated until the tire 50 is decelerated from the set rotation velocity V and stopped is ΔW (degree), the time T1 is calculated by the following equation based on angular velocity ω of the tire 50.

$$T1 = (W - \Delta W) / \omega$$

wherein the values ΔW and ω are calculated based on the following equations.

$$\omega = 360 / T$$

$$\Delta W = (1/2) \times \omega \times T2$$

It should be noted that T2 denotes a deceleration time to be taken until the tire is decelerated from the set rotation velocity V and stopped.

When the second detection of the barcode 51 by the barcode scanner 53 is performed, the time measurement is started again with a time at the time point t=0 (S8). It should be noted that on the premise that after the second detection of the barcode 51 is performed (S5), the steps of storing the time T from the start to the stop of the time measurement (S6) and calculating the time T1 to be taken to the target stopping angle designated in advance (S7) are performed instantaneously, the time measurement is started again with the time t=0 and the time T1 is calculated as above. However, a minute time tm to be taken for the steps S6 and S7 may be considered and a value obtained by subtracting the time tm from the above time T1 may be replaced with the time T1.

When the measured time t becomes the time T1 calculated in S8 or more (S9), rotation of the pressing roller 9a is stopped and the rotation of the tire 50 is stopped (S10).

By the above processing, the position of the barcode 51 of the tire 50 can be stopped at the target stopping angle W. Thereby, the rotation angle can be easily calculated based on the time to be taken for next detection after detecting the barcode 51 by the barcode scanner 53.

Figure 7C:
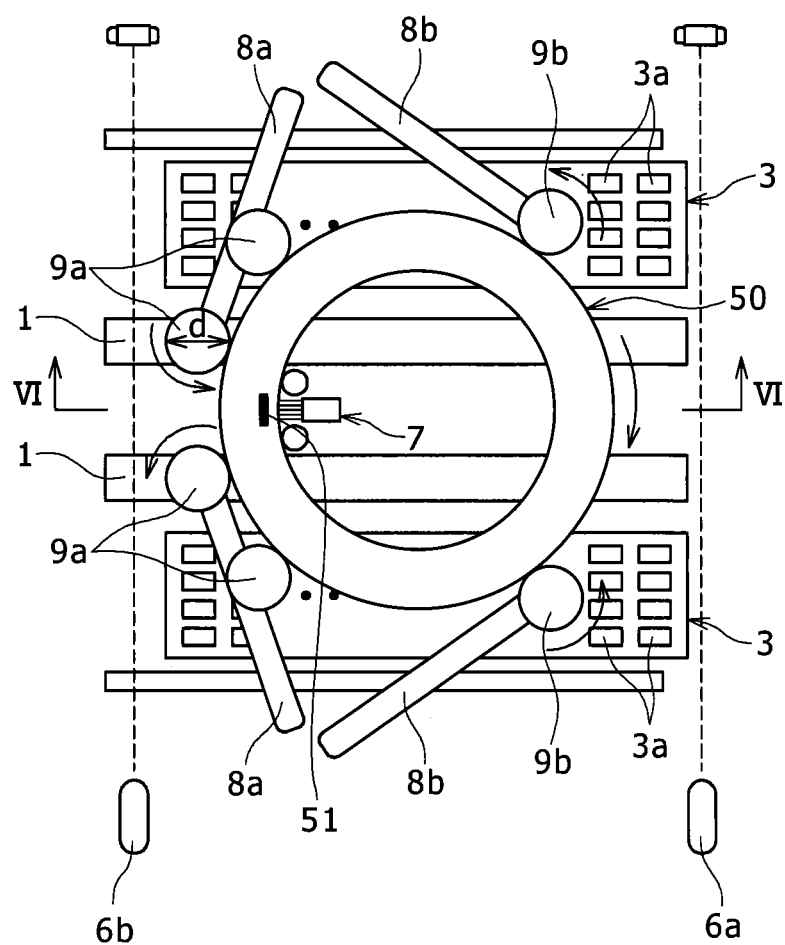
FIG. 7C is a top view showing a process of applying a lubricant to a bead portion of the tire by a lubricator.
Figure 8:
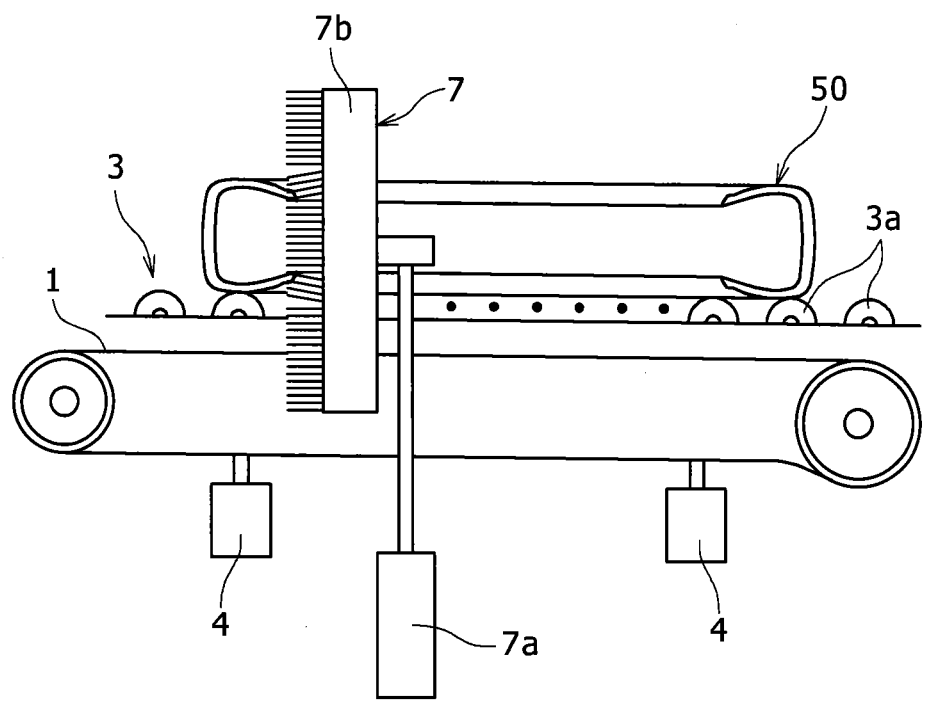
FIG. 8 is a sectional view taken along the line VI-VI of FIG. 7C.
Figure 9:
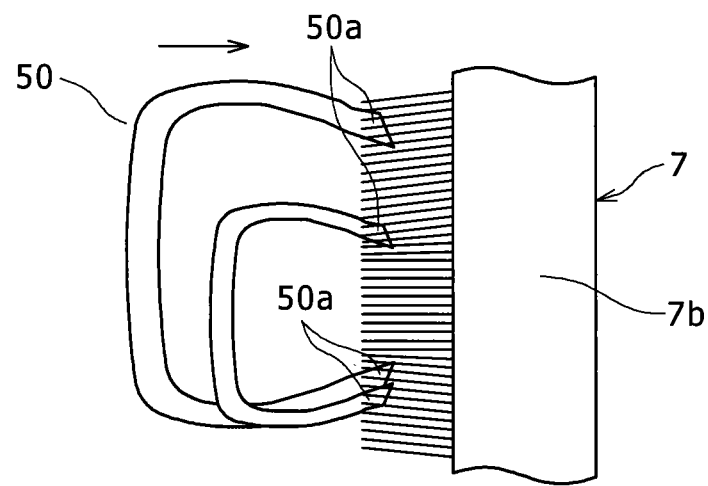
FIG. 9 is an enlarged sectional view showing a brush of the lubricator of FIG. 7.

As described above, when the position of the barcode 51 is monitored, as shown in FIG. 7C, the small air cylinder 7d is actuated, and the brush 7b of the lubricator 7 is brought into a state where the brush is advanced in the direction perpendicular to the axis of the air cylinder 7a, that is, the axes of the positioning rollers 7c. After that, the time measurement is started again with the time t=0, and until the time T1 elapses, the pressing roller 9a attached to the front end part of the first arm member 8a is driven and rotated by the motor 12, and as shown in FIGS. 8 and 9, the tire 50 on the roller sections 3 is rotated in the horizontal plane, and the brush 7b of the lubricator 7 applies the lubricant to the bead portion 50a of the tire 50. When the time T1 elapses and application of the lubricant to the bead portion 50a of the tire 50 by the lubricator 7 is finished, drive and rotation of the motor 12 of the pressing roller 9a are stopped, and the rotation of the tire 50 is stopped. Even at the time point when the rotation of the tire 50 is stopped, the position of the barcode 51 is monitored. Thus, the position of the barcode 51 can be grasped based on the rotation angle θ relative to the direction connecting the position where the barcode 51 is detected and the center of the tire 50.

Figure 10A:
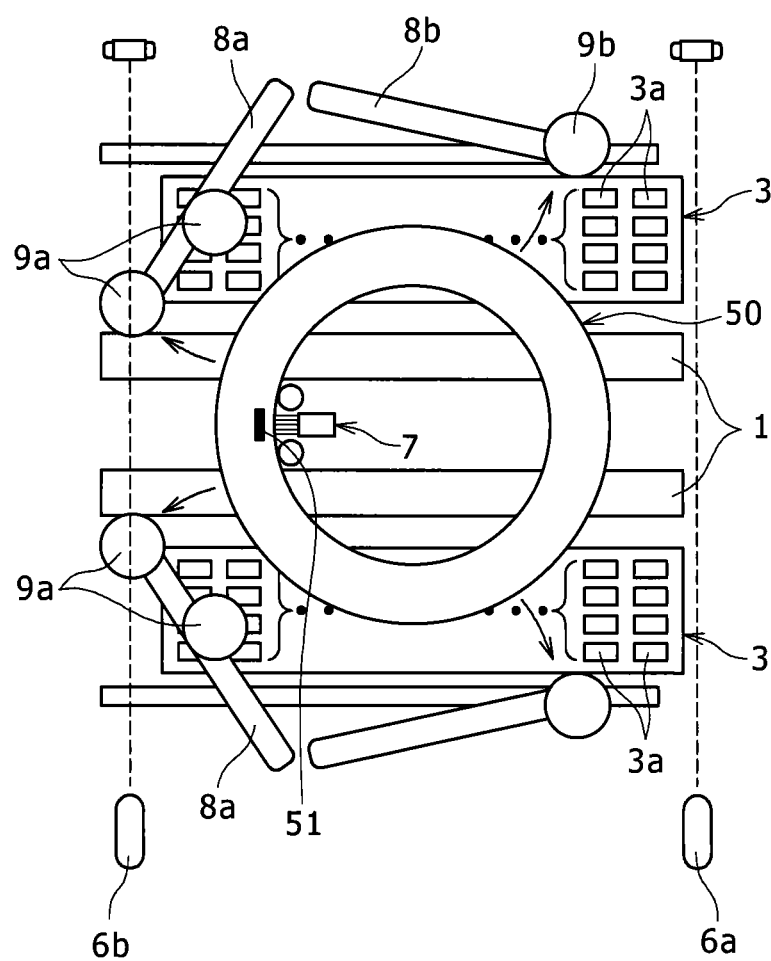
FIG. 10A is a top view showing a process of releasing the tire to which the lubricant is applied from the arms and the pressing rollers.

After that, as shown in FIG. 10A, the first arm members 8a and the second arm members 8b are pivoted to the outer sides in the width direction into an open state, and pressing of the tire 50 by the pressing rollers 9a, 9b is canceled. The conveying surface of the first belt conveyors 1 is raised to the upper side of the roller sections 3 by the cylinder 4, and the tire 50 is moved and mounted onto the first belt conveyors 1 again.

Figure 10B:
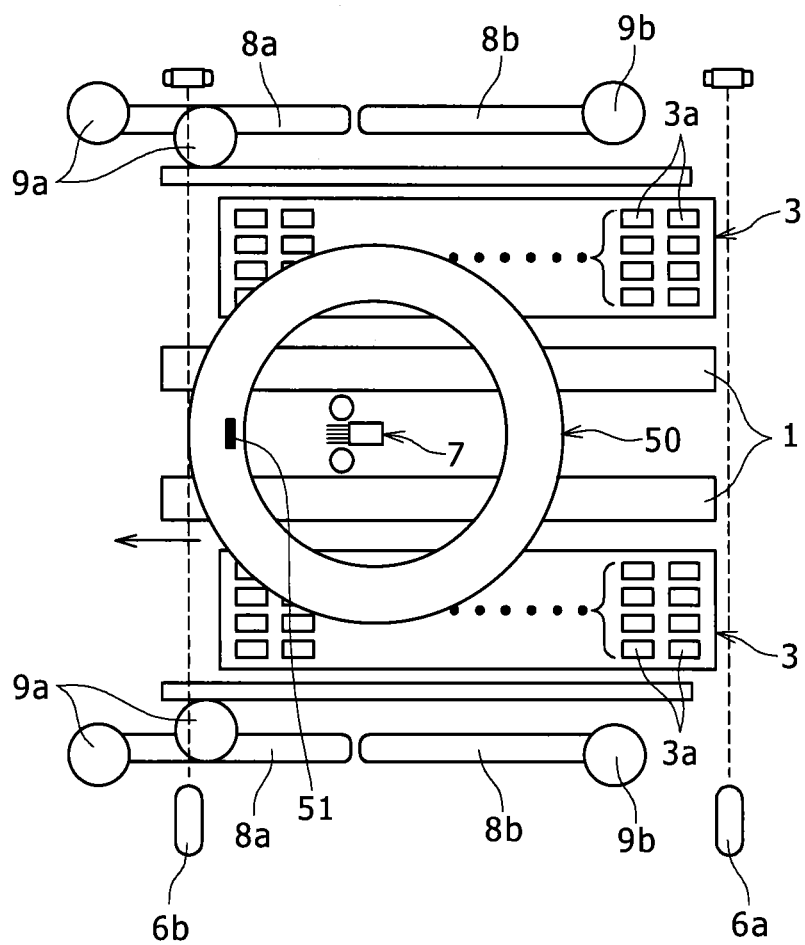
FIG. 10B is a top view showing a process of releasing the tire to which the lubricant is applied from the arms and the pressing rollers.

Next, as shown in FIG. 10B, by rotating the belt conveyor servomotor and driving the first belt conveyors 1, the tire 50 is pushed out to the downstream side in the conveying direction again. Meanwhile, the lubricator 7 after finishing the application of the lubricant is lowered by the air cylinder 7a and returned to a stand-by position below the roller sections 3. As shown in FIG. 10B, the front end of the tire 50 is moved to a position where the front end is detected by the photoelectric sensor 6b and positioned there.

Figure 11:
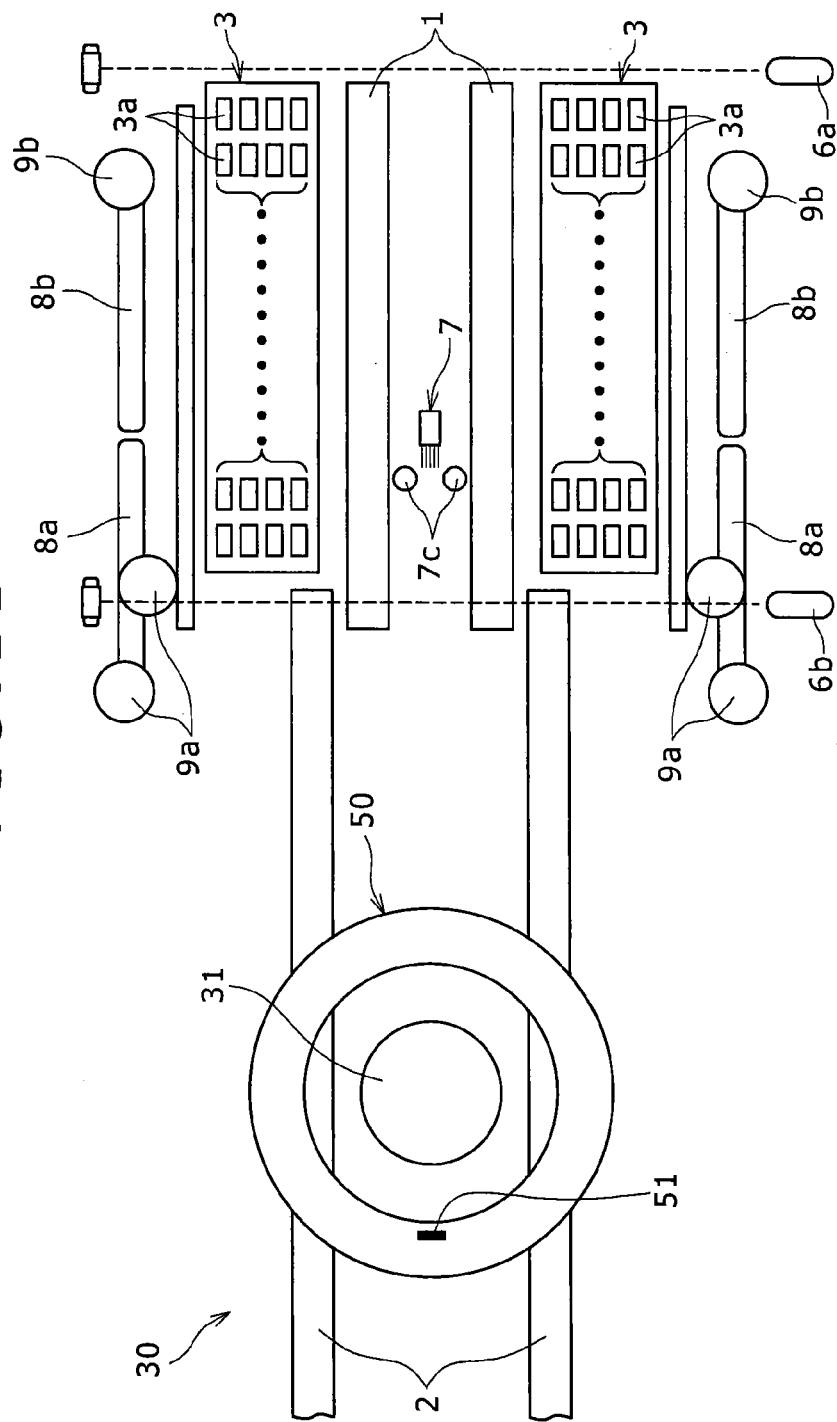
FIG. 11 is a top view showing a process of feeding the tire to which the lubricant is applied into a test station.

Finally, as shown in FIG. 11, the belt conveyor servomotors are rotated, the first belt conveyors 1 and the second belt conveyors 2 are driven, and the tire 50 is fed into the rotation center position of the spindles 31 of the test station 30. It should be noted that the small air cylinder 7d is actuated and the brush 7b of the lubricator 7 is returned into a state where the brush is retreated in the direction perpendicular to the axis of the air cylinder 7a, that is, the axes of the positioning rollers 7c.

Although not shown in the figure, the bead portion 50a of the fed tire 50 is fitted into a rim member and the tire is attached to the spindles 30 sideways. In the test station 50, the test of the tire 50 is performed. Since the position of the barcode 51 (rotation angle θ relative to the direction connecting the position where the barcode 50 is detected and the center of the tire 50) is already known, in the test station 50, the controller 55 can manage measurement data in the circumferential direction of the tire with the position of the barcode 51 as a start point.

In such a way, in the tire testing machine 100 of the present embodiment, the position the identifying information of the tire can be stably grasped, and the rotation of the tire can be stopped at an arbitrary desired angle. In the tire testing machine 100 of the present embodiment, before the lubricating liquid is applied to the bead portion 50a on the inner periphery of the tire 50, the position of the barcode 51 is detected. The position of the barcode 51 of the tire is monitored based on the rotation angle relative to the direction connecting the position of the barcode 51 of the tire and the center of the tire. Therefore, even when the barcode 51 cannot be detected by the barcode scanner 53 in any state after that, the position of the barcode 51 of the tire 50 can be stably grasped. The position of the barcode 51 of the tire 50 can be directed in the desired angle direction. Since the first arm members 8a and the second arm members 8b and the barcode scanner 53 are arranged on the upstream side in the conveying direction of the test station 30, placement of an extra device into the tire testing machine 100 in order to direct the position of the barcode 51 of the tire 50 in the desired angle direction can be prevented.

The preferred embodiment of the present invention is described above. However, the present invention is not limited to the above embodiment but can be variously changed within the scope of the claims.

In the tire testing machine 100 according to the above embodiment, sensors that detect the front end and the rear end of the tire 50 on the first belt conveyors 1 are the non-contact type photoelectric sensors 6a, 6b. However, the sensors can also be other non-contact type sensors or contact-type sensors.

In the tire testing machine 100 according to the above embodiment, the conveyor that feeds the tire 50 into the test station 30 is the belt conveyor which is divided into two sets of conveyors including the first belt conveyors 1 and the second belt conveyors 2. However, this conveyor can also be one continuous belt conveyor or a conveyor other than the belt conveyor.

In the tire testing machine 100 according to the above embodiment, in the roller sections 3, each of the mounting rollers 3a includes the child rollers 3b having the rotation axes orthogonal to the rotation axis of the mounting roller. However, as long as the tire is rotatably mounted, free rollers of other structures can also be used.

Figure 13:
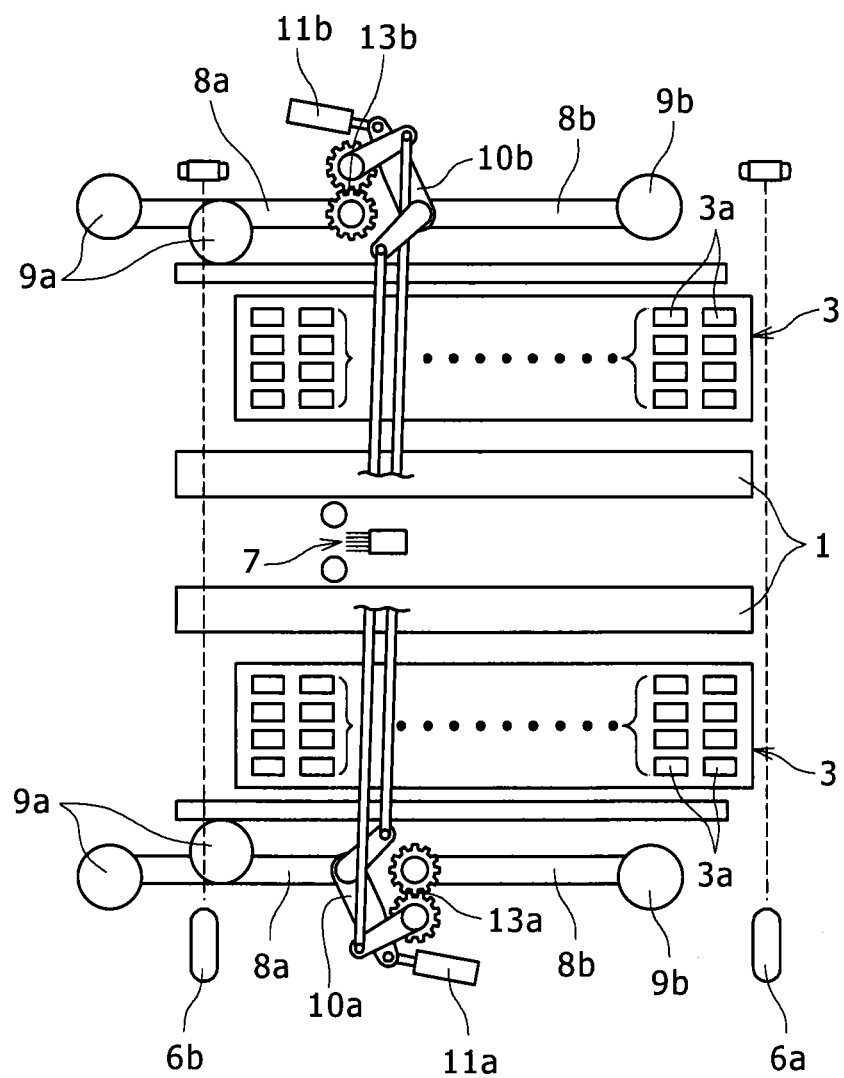
FIG. 13 is a plan view showing a modified example of a pivoting mechanism of arm members shown in FIG. 1.

In the tire testing machine 100 according to the above embodiment, the mechanism that pivots the arm members 8a, 8b can also be combination of the link mechanisms 10a, 10b and gear mechanisms 13a, 13b as in a modified example shown in FIG. 13.

In the tire testing machine 100 according to the above embodiment, the lubricator 7 includes the pair of positioning rollers 7c to be abutted so as to position the inner periphery of the tire 50. However, the lubricator does not necessarily include the positioning rollers.

In the tire testing machine 100 according to the above embodiment, by the pair of arm members 8a and the pair of arm members 8b respectively provided on the downstream and the upstream of the first belt conveyors 1, the tire 50 is gripped from four directions and rotated. However, only the pair of arm members 8a on the upstream side in the conveying direction may be provided and the tire may be gripped from two directions and rotated.

The tire rotation device is not limited to the rollers 9a to be abutted with the tire 50 but other means can also be adopted. The tire conveyed by the conveyor 5 is moved to the conveyors 2. However, the mounting rollers 3a of the roller sections 3 may be formed by lining with rotation type rollers (lower roller members) in which a motor is built for example and no belt sections 1 may be provided. The rotation type rollers (lower roller members) support the tire 50 from the lower side. When the tire 50 is rotated, after the tire 50 is gripped by the arms 8a, 8b, one of the pair of rotation type rollers (lower roller members) positioned at axisymmetric places with respect to the center axis of the tire 50 is rotated in the conveying direction of the tire for example, and the other rotation type roller is rotated reversely to the conveying direction of the tire. Thereby, the tire 50 can be rotated.

What is claimed is:

1. A tire testing machine that tests a tire on which identifying information is installed, the tire testing machine comprising:
   a test station in which spindles to attach the tire are provided;
   a conveyor that feeds the tire into a center position of the spindles;
   a tire rotation device arranged in said conveyor on the upstream side in the conveying direction of said test station, the tire rotation device that rotates the tire;
   an identifying information detection sensor arranged in said conveyor on the upstream side in the conveying direction of said test station, the identifying information detection sensor that detects the identifying information installed on the tire which is rotated by said tire rotation device; and
   a control unit that detects the identifying information on the tire which is being rotated by said tire rotation device, by means of said identifying information detection sensor, calculates a rotation angle of the tire which is being rotated by said tire rotation device, relative to the direction connecting a position of the detected identifying information and the center of the tire, monitors a position of the identifying information of the tire which is being rotated by said tire rotation device, and further, when the calculated rotation angle of the tire becomes a target stopping angle designated in advance, stops rotation of the tire.

2. The tire testing machine according to claim 1, further comprising:
   a lubricator that applies a lubricant to a bead portion on an inner periphery of the tire rotated by said tire rotation device,
   wherein said control unit detects the identifying information of the tire rotated by said tire rotation device by means of said identifying information detection sensor before applying the lubricant to the bead portion on the inner periphery of the tire by means of said lubricator.

3. The tire testing machine according to claim 1,
   wherein said tire rotation device has an arm member that grips the tire conveyed by said conveyor, and a rotation roller arranged in a front end of said arm member, the rotation roller to be rotatably abutted with the tire, and
   wherein said control unit calculates the rotation angle based on a rotation number of said rotation roller, a circumferential length of said rotation roller, and a circumferential length of the tire.

4. The tire testing machine according to claim 1,
   wherein said tire rotation device has an arm member that grips the tire conveyed by said conveyor, and a rotation roller arranged in a front end of said arm member, the rotation roller to be rotatably abutted with the tire, and
   wherein said control unit calculates the rotation angle based on a time to be taken for a next detection of the identifying information on the tire which is being rotated by said tire rotation device, after once detecting the identifying information by means of said identifying information detection sensor.

5. The tire testing machine according to claim 1,
   wherein said tire rotation device has a rotatable lower roller member that supports the tire conveyed by said conveyor from the lower side, and
   wherein said control unit calculates the rotation angle based on a time to be taken for a next detection of the identifying information on the tire which is being rotated by said tire rotation device, after once detecting the identifying information by means of said identifying information detection sensor.

6. The tire testing machine according to claim 1,
   wherein the target stopping angle is an angle when the tire is fed into said test station.

7. The tire testing machine according to claim 1,
   wherein the identifying information is a barcode, and said identifying information detection sensor is a barcode reader.

8. A tire testing machine that tests a tire on which identifying information is installed, the tire testing machine comprising:
   a test station in which spindles to attach the tire are provided;
   a conveyor that feeds the tire into a center position of the spindles;
   a tire rotation device arranged in said conveyor on the upstream side in the conveying direction of said test station, the tire rotation device that rotates the tire;
   an identifying information detection sensor arranged in said conveyor on the upstream side in the conveying direction of said test station, the identifying information detection sensor that detects the identifying information installed on the tire which is rotated by said tire rotation device; and
   a control unit that detects the identifying information on the tire which is being rotated by said tire rotation device, the control unit including:
   means for determining a time for a next detection of the identifying information on the tire which is being rotated by said tire rotation device, after once detecting the identifying information by means of said identifying information detection sensor;
   means for determining a time required for the tire which is being rotated by said tire rotation device to reach a stop angle based on the time to be taken for the next detection of the identifying information on the tire which is being rotated by said tire rotation device; and
   means for stopping the rotation of the tire after the elapse of the time required for the tire which is being rotated by said tire rotation device to reach the stop angle based on the time to be taken for the next detection of the identifying information on the tire which is being rotated by said tire rotation device.

* * * * *